(12) United States Patent
Samsoniuk et al.

(10) Patent No.: US 11,227,092 B2
(45) Date of Patent: Jan. 18, 2022

(54) MAIN BOARD WITH INTEGRATED TRUSTED PLATFORM MODULE FOR A COMPUTER DEVICE AND METHOD FOR PRODUCING A MAIN BOARD WITH INTEGRATED TRUSTED PLATFORM MODULE

(71) Applicant: Unify Patente GmbH & Co. KG, Munich (DE)

(72) Inventors: Marcelo Samsoniuk, Curitiba (BR); Paulo Henrique Bernardi, Curitiba (BR); Evandro Hauenstein, Curitiba (BR)

(73) Assignee: Unify Patente GmbH & Co. KG, Munich (DE)

(*) Notice: Subject to any disclaimer, the term of this patent is extended or adjusted under 35 U.S.C. 154(b) by 0 days.

(21) Appl. No.: 17/186,415

(22) Filed: Feb. 26, 2021

(65) Prior Publication Data
US 2021/0271798 A1  Sep. 2, 2021

(30) Foreign Application Priority Data
Feb. 28, 2020 (EP) ..................................... 20160105

(51) Int. Cl.
*G06F 30/392* (2020.01)
*G06F 115/12* (2020.01)
*H05K 13/00* (2006.01)

(52) U.S. Cl.
CPC ........ *G06F 30/392* (2020.01); *G06F 2115/12* (2020.01); *H05K 2201/0909* (2013.01)

(58) Field of Classification Search
CPC ... G06F 30/30–398; G06F 2111/00–20; G06F 2113/00–20; G06F 2115/00–12; G06F 2117/00–12; G06F 2119/00–22; H05K 2201/0909
See application file for complete search history.

(56) References Cited

U.S. PATENT DOCUMENTS

| | | | |
|---|---|---|---|
| 6,979,733 | B2 | 12/2005 | Zhao et al. |
| 10,275,599 | B2 | 4/2019 | Collart et al. |
| 10,860,069 | B2 | 12/2020 | Kruse |
| 2009/0221185 | A1 | 9/2009 | Verding |
| 2010/0170953 | A1 | 7/2010 | Schaade |

FOREIGN PATENT DOCUMENTS

| | | |
|---|---|---|
| JP | H09181442 A | 7/1997 |
| KR | 200455025 Y1 | 8/2011 |

*Primary Examiner* — Leigh M Garbowski
(74) *Attorney, Agent, or Firm* — Buchanan Ingersoll & Rooney PC

(57) ABSTRACT

A main board for a computer device can include main board components arranged on a first surface of the main board and Trusted Platform Module (TPM) components arranged on the first surface of the main board. The TPM components can be located in a predetermined area of the main board that is detachable from the main board (e.g. by means of a predetermined break line). A method for producing an embodiment of the main board with an integrated TPM can include producing a Printed Circuit Board (PCB); arranging a plurality of main board components in a first area of the PCB; and arranging TPM components in a second area of the PCB that is a detachable predetermined area of the main board. A predetermined breakline which at least partly surrounds the predetermined area can be formed by drilling holes to form a perforated line.

16 Claims, 2 Drawing Sheets

MAIN BOARD WITH INTEGRATED TRUSTED PLATFORM MODULE FOR A COMPUTER DEVICE AND METHOD FOR PRODUCING A MAIN BOARD WITH INTEGRATED TRUSTED PLATFORM MODULE

CROSS-REFERENCE TO RELATED APPLICATIONS

The present application claims priority to European Patent Application No. EP 20 160 105.1, which was filed on Feb. 28, 2020. The entirety of this application is incorporated by reference herein.

FIELD

The present invention relates to a main board with integrated Trusted Platform Module for a computer device and to a method for producing a main board with integrated Trusted Platform Module.

BACKGROUND

A so-called Trusted Platform Module (TPM) is a technology designed to provide encrypted storage and cryptographic services for a host system. Namely, a TPM is a cryptographic device for enabling trusted computing. Typically, storage and services are embedded in a single chip, in order to ensure that the encrypted storage and services are not easily accessible by any means other than the special interface between the module and the host.

For example, U.S. Pat. No. 10,275,599 deals with such TPM technology and discloses a typical solution for a mother board that includes all processing and storage elements and with a removable TPM module.

SUMMARY

As long as all elements in the mother board are easily accessible, for example the Real-Time Clock (RTC) and Random Access Memory (RAM) devices, the mother board is non-trusted, which means that it can be easily hacked. However, in order to ensure that the firmware and other software are not hacked, they are validated by the TPM module.

Of course, in order to make the mother board replaceable, the TPM chip is mounted in a small module plugged in the computer main board, in a way that when the main board is replaced, the same TPM module can be removed from the old board and inserted in the new board, ensuring that all secrets stored in the TPM chip are safe.

However, we determined that a problem with respect to the solution described above is that it is rather expensive since it requires manufacturing two different boards: the mother board and the TPM module. When considering the large number of these components being produced, the separate TPM module causes considerable costs, since it requires an additional part number, additional manufacture process, additional test process, additional storage and logistics, etc.

Thus, already the handling costs may double or triple the final production costs of the separate TPM module.

A typical approach known from prior art so as to reduce the costs is to reduce the number of components to a minimum as well as to use rather cheap components regarding the Printed Circuit Board (PCB), the TPM chip, and the chipset.

However, as competition and prize-fighting on the electronics and specifically computer market, is strong, and it is an ongoing goal to further reduce costs, the above mentioned measures might still not be sufficient to limit the costs.

Therefore, embodiments of the present invention can be based on the object to provide a solution for further reducing the productions costs of main boards and TPM modules. This object can be solved for some embodiments of the present invention by a main board with integrated TPM for a computer device that have a particular set of features. For example, in some embodiments a main board for a computer device can include a plurality of main board components arranged on a first surface of the main board. Trusted Platform Module (TPM) components can be arranged on the first surface of the main board as well. The TPM components can be located in a predetermined area of the main board. The predetermined area can be detachable from the main board by means of a predetermined break line. Thus, according to the inventive solution of this embodiment, the TPM chip can be integrated into the main board of the computer whereby production costs compared to producing the main board and the TPM chip separately can be reduced, as well as costs related to logistics and service. Accordingly, the main board with integrated TPM can offer an easy and economic solution for protecting firmware (basic input/output system (BIOS), baseboard management controller (BMC), ME, IE, etc.). The integration of the TPM chip with the main board does not require the use of a special purpose processor, thus, further reducing the costs of production. However, at the same time, the option to detach the TPM chip, if needed, is maintained.

According to a preferred embodiment of the invention, the predetermined area forms a TPM integrated with the main board.

According to another preferred embodiment of the invention, the predetermined break line is formed by at least a portion of the predetermined area being surrounded by a perforated line.

According to still another preferred embodiment, the perforated line comprises a plurality of holes respectively extending from the first surface of the main board to a second surface on the backside of the main board.

Preferably, electric signal lines for connecting the predetermined area forming the integrated TPM to the main board are respectively provided so as to pass through an area between respectively two holes of the perforated line.

According to yet another preferred embodiment of the invention, the predetermined break line further comprises at least one cut-out area provided at at least one edge of the predetermined area.

Preferably, at least one cut-out area is formed as a slot starting from an outer edge of the main board and ending at the perforated line confining the predetermined area at an edge substantially parallel to the outer edge.

It can also be advantageous, if a fixing means is provided in the predetermined area forming the TPM. For instance, the fixing means can be a hole for receiving a bolt or pin therein. Also, other fixing means may be conceivable.

According to still another preferred embodiment of the invention, a spare TPM connector is provided on the main board at a location outside of the predetermined area.

The components may comprise, but are not limited to, integrated circuits (including, but not limited to, processors, memories and other integrated circuits), connectors and other passive components that are specific for specific configurations of components and are not relevant for this general description Preferably, the TPM components comprise, but are is not limited to, a connector (generically known as "TPM connector"), an integrated circuit designed to support TPM applications (generically known as "TPM IC") and other passive components (that are specific for specific TPM ICs and are not relevant for this general description).

Moreover, embodiments of a method for producing a main board with an integrated TPM is provided. Some embodiments of the method can include: producing a Printed Circuit Board (PCB); arranging a plurality of main board components in a first area of the PCB; arranging TPM components in a second area of the PCB, the second area being a detachable predetermined area of the main board; and creating a predetermined breakline which at least partly surrounds the predetermined area by drilling a plurality of holes forming a perforated line which at least partially surrounds the predetermined area.

Embodiments of the method may further comprise a step of forming a cut-out at at least one edge of the predetermined area.

The method may further comprise a step of arranging a spare TPM connector on the main board, the location of the spare TPM connector being outside of the predetermined area.

Other details, objects, and advantages of the main board with integrated TPM for a computer device, telecommunications apparatus, system, device, and methods of making and using the same will become apparent as the following description of certain exemplary embodiments thereof proceeds.

BRIEF DESCRIPTION OF THE DRAWINGS

The invention and embodiments thereof will be described below in further detail in connection with the drawings. It should be understood that like reference characters used in the drawings may identify like components.

Figure 1:
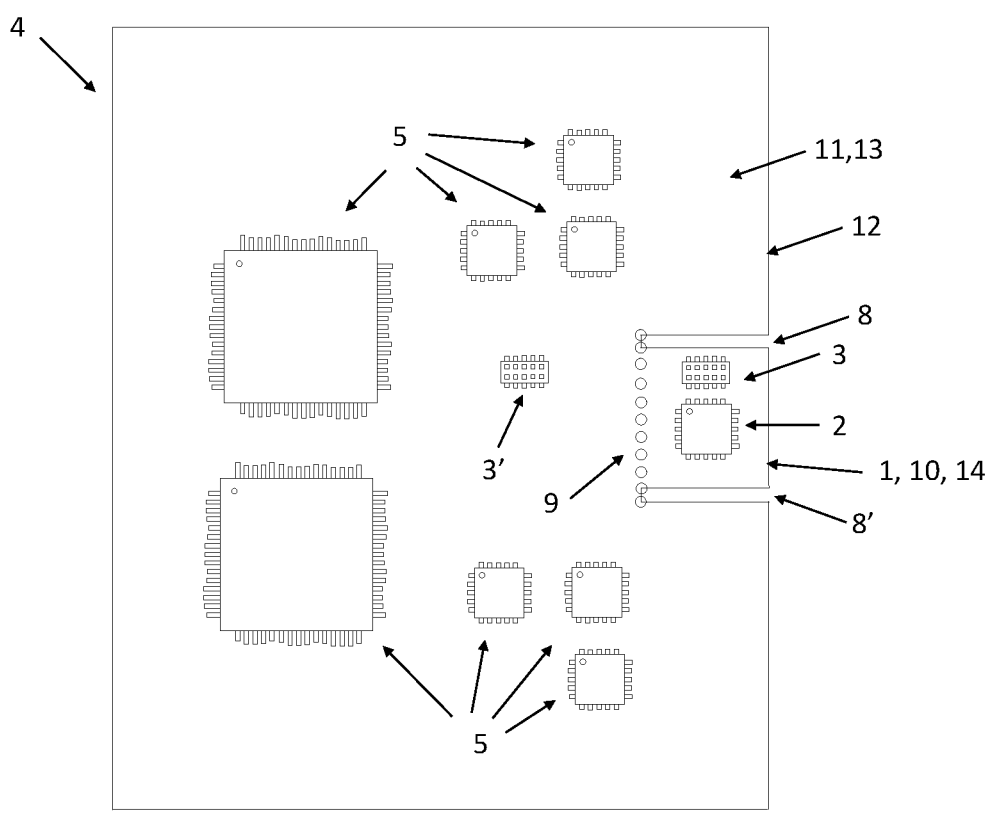
FIG. 1 schematically illustrates a main board for a computer device according to an embodiment of the present invention.

Reference numerals utilized in the drawings include:
1 TPM module;
1' spare TMP module;
2 TPM component;
3 TPM component;
3' spare TPM connector;
4 main board;
5 other main board components;
6 electrical signal lines;
7 drill holes;
8 pre-cuts;
9 perforated line;
10 predetermined area;
11 first surface or top surface of main board;
12 outer edge of main board;
13 first area of main board;
14 second area of main board;
15 hole; and
15' corresponding hole

DETAILED DESCRIPTION

FIG. 1 schematically shows a Printed Circuit Board (PCB), configured as a motherboard or main board 4 of a computer or computational device, on the top surface or first surface 11 of which several components 5, as amongst others, a set of integrated circuits (including, but not limited to, processors, memories and other integrated circuits), connectors, interfaces and passive components are provided within a first area 13. According to an embodiment of the present invention, the main board 4 also comprises a second area 14, which is a predetermined area 10 in which TPM components 2, 3 are provided, typically a TPM IC 2 and a TPM connector 3, as well as passive components now shown in the figure, thus, forming a detachable TPM module 1 integrated into the main board 4.

The predetermined area 10 of the main board 4 in which the TPM components 2, 3 are arranged in the embodiment shown in FIG. 1 is configured as a rectangular-shaped part located at one of the edges of the main board 4. It is noted that other locations and shapes of the predetermined area 10 are also conceivable, such as one of the corners. However, as the predetermined area 10 according to this embodiment is located at the middle of the edge of the main board 4, a predetermined breakline only needs to be provided in one edge of the predetermined area 13. Namely, as in the embodiment shown here, the predetermined breakline is provided by one perforated line 9, complemented by two pre-cut lines 8, 8' that enable detachment of the predetermined area 10 by breaking in the perforated line 9.

The predetermined area 10 which forms the integrated detachable TPM module 1 is surrounded by the above mentioned perforated line 9 at one edge so that it may easily be detached, if required. Further, the main board 4 can be equipped with a spare TPM connector 3' which may be used to connect a detachable TPM module 1 that has been detached from another main board 4.

This solution can enable manufacturing of the detachable TPM module 1 and the main board 4 in one piece and at the same time, thereby, reducing the production costs compared to separate production of the two parts. Also, the quality of the detachable TPM module 1 will be increased compared to rather cheap TPM modules which are commonly used in computers, since the detachable TPM module 1, as it is integrated in the main board 4 and forms part of it, is produced in the same production process with the main board and is subject to the same quality control as the main board 4. Further, it enables replacing the main board 4 in field, e.g. out of the headquarters, so that the service staff can be enabled to quickly repair the system in the customer installation, by first simply detaching the detachable TPM module 1 and then plugging the detached TPM module 1 into a different main board 4.

It is noted that since there may be the need to sell some of the main boards separately, e.g. the motherboard or main board 4 without a detachable TPM module 1, or to sell only a TPM module 1 alone, this may be simply achieved by detaching the TPM module 1 from some of the produced main boards 4 so that the modules may be sold separately and the main boards 4 may be sold without a TPM module 1. Thereby, spare boards may also be provided which may be used in field to receive detached TPM modules from faulty boards. Also, the separate TPM modules may be used in field to be attached to mother boards that do not have an integrated TPM module because it was detached for some reason.

Figure 2:
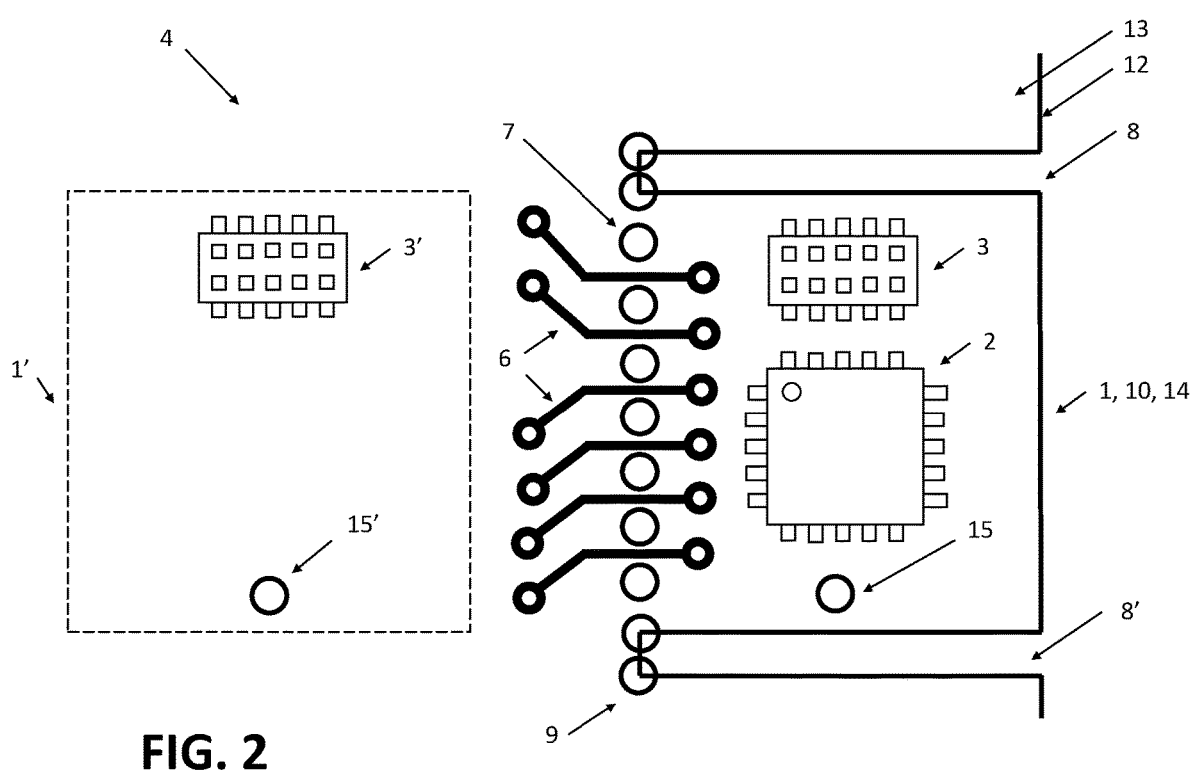
FIG. 2 schematically illustrates the electrical connection of a TPM to a main board according to an embodiment of the present invention.

FIG. 2 schematically illustrates an exemplary embodiment of an electrical connection of a detachable TPM 1 to a main board 4. As part of an electrical-mechanic solution, the drilled finish between the main board 4 and the integrated detachable TPM module 1 can be done in a way such that the electrical signal lines 6 pass between the drill holes 7 which form the perforated line 9. When detached, the main board 4 will break apart between the drill holes 7 and the signal lines 6 can bee interrupted too. In order to make the detachment of the TPM module 1 easy, according to an embodiment, the TPM module 1 can be pre-cut at some positions, which here are indicated by the reference numerals 8, 8'. In the embodiment shown here, the predetermined breakline further comprises two cut-out areas or pre-cuts 8, 8' which are formed respectively as a slot starting from an outer edge 12 of the main board 4 and which both end at the perforated line 9, which here in contrast to the embodiment shown in FIG. 1 according to which the entire predetermined breakline is formed by a perforated line 9 on the main board 4, is only provided along one side of the predetermined area 10, namely the side or edge running substantially parallel to the outer edge 12 of the main board 4. Accordingly, the predetermined area 10, as one edge is the outer edge 12 of the main board 4, is confined by a first perforated line 9 and multiple cut-outs 8, 8' on the mainboard 4 (e.g. a first perforated line 9 and first and second cut-outs 8, 8').

In some embodiments, there may only be a single perforated line 9. In other embodiments, there may be more than one perforated line 9. Also, some embodiment may only include a single cut-out, or no cut-outs. In yet other embodiments, there may be more than two cut-outs.

When detached, the TPM module 1 can be plugged in a similar connector 3' of another main board 4, as has been already explained with respect to the embodiment shown in FIG. 1, such that it will use the space reserved for the spare TPM module 1' which is indicated by the dashed line indicated by reference numeral 1'. If required, the TPM module 1 may be attached to the new main board 4, for example, by means of inserting a spacer, i.e. a nylon standoff spacer or a spacer bolt through a hole 15 provided on the detached TPM module 1 and a corresponding hole 15' provided on the mother board 4 area for the spare TPM module 1'.

As to connecting the signals or signal lines, this may be achieved in various ways. Since the typical detachable TPM module 1 may only require a small number of signals, for example, in the case of a TPM IC being connected via a Serial Peripheral Interface (SPI) interface, only six signals may be required—SCLK, MOSI, MISO, CS, VCC and GND (serial clock, master out slave in, master in slave out, chip select, power input, and power ground), the connection may not pose any problems and may easily be disconnected when the PCB itself breaks in the perforated line 9. The above exemplified connection is a standard SPI interface and works as a bus, in a way that the only requirement here is a separated chip select (CS) for the detachable TPM module 1 and the spare TPM module 1', in a way that a Jumper can control the CS line routing to the on-board detachable module TPM module 1 or routed to the main board 4 connector 3'.

When replacing a main board 4 in a computer device, it is also possible to detach the detachable TPM module 1 and plug in a spare board that already has a detachable TPM module 1 connected thereto. For instance, when the TPM IC is connected via an SPI interface, it can be possible to work with both TPM modules at the same, since the SPI bus is shared and separate CS are provided, one for each TPM IC. Also, in case a general purpose processor does not support more than one CS for TPM IC, according to another embodiment, it is possible to use a jumper in order to route the CS to the active TPM IC in the detachable TPM module 1 or in the spare TPM module 1', that is plugged via the main board 4 connector 3'.

It should be appreciated that different embodiments of the method, system, and apparatus can be developed to meet different sets of design criteria. For example, the particular type of TPM or PCB can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a system, main board with integrated TPM for a computer device, and methods of making and using the same have been shown and described above, it is to be distinctly understood that the invention is not limited thereto but may be otherwise variously embodied and practiced within the scope of the following claims.

What is claimed is:

1. A main board for a computer device comprising:
a plurality of main board components arranged on a first surface of the main board, and
Trusted Platform Module (TPM) components arranged on the first surface of the main board;
wherein the TPM components are located in a predetermined area of the main board, the predetermined area being detachable from the main board by means of a predetermined break line.

2. The main board according to claim 1, wherein the predetermined area forms a TPM integrated with the main board.

3. The main board of claim 2, wherein the predetermined break line is formed by at least a portion of the predetermined area being surrounded by a perforated line and/or pre-cut lines.

4. The main board according to claim 3, wherein the perforated line comprises a plurality of spaced apart holes respectively extending from the first surface of the main board to a second surface on the backside of the main board.

5. The main board according to claim 4, wherein electric signal lines for connecting the predetermined area forming the integrated TPM to the main board are respectively provided so as to pass through an area between multiple holes of the perforated line.

6. The main board according to claim 1, wherein the predetermined break line comprises at least one cut-out area provided at at least one edge of the predetermined area.

7. The main board according to claim 6, wherein the at least one cut-out area is formed as a slot starting from an outer edge of the main board and ending at the perforated line confining the predetermined area at an edge substantially parallel to the outer edge.

8. The main board according to claim 1, comprising a fixing mechanism in the predetermined area forming the TPM, the fixing mechanism including a hole for receiving a bolt or pin therein.

9. The main board of claim 1, wherein a spare TPM connector is provided on the main board at a location outside of the predetermined area.

10. The main board according to claim 1, wherein the main board components comprise connectors, integrated circuits, passive components and interfaces.

11. The main board of claim 10, wherein the TPM components comprise a TPM connector, a TPM integrated circuit, passive components and interfaces.

12. A method for producing a main board with an integrated Trusted Platform Module (TPM), comprising:
    producing a Printed Circuit Board (PCB);
    arranging a plurality of main board components in a first area of the PCB;
    arranging TPM components in a second area of the PCB, the second area being a detachable predetermined area of the main board; and
    creating a predetermined breakline which at least partly surrounds the predetermined area by drilling a plurality of holes to form a perforated line which at least partially surrounds the predetermined area.

13. The method according to claim 12, comprising:
    forming a cut-out at at least one edge of the predetermined area.

14. The method of claim 13, comprising:
    arranging a spare TPM connector on the main board, the spare TPM connector being outside of the predetermined area.

15. The method of claim 12, wherein the main board components comprise connectors, integrated circuits, passive components and/or interfaces.

16. The method of claim 15, wherein the TPM components comprise a TPM connector, a TPM integrated circuit, passive components and/or interfaces.

* * * * *